Jan. 30, 1968  S. D. BURTON  3,366,136
SPRING ACTUATED DEVICES
Filed April 1, 1964
Fig.1
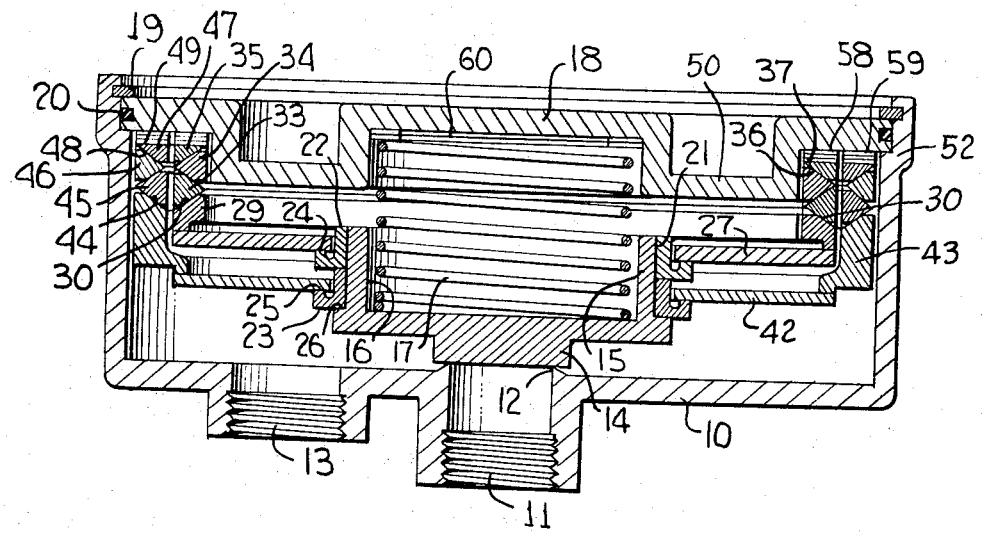
Fig.2
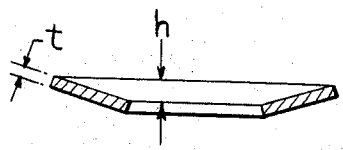
Fig.3
Fig.4
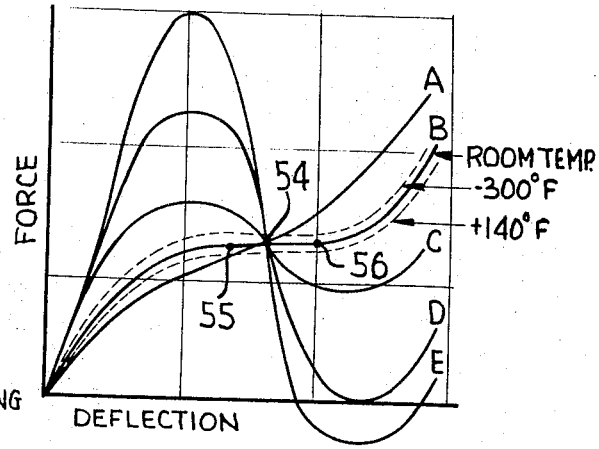
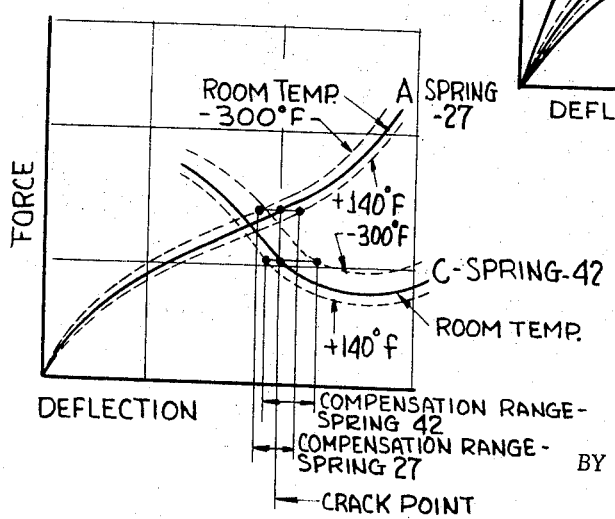
INVENTOR
SAMUEL D. BURTON
BY John N. Wolfram
ATTORNEY

3,366,136
SPRING ACTUATED DEVICES
Samuel D. Burton, Pacific Palisades, Calif., assignor to Parker-Hannifin Corporation, Cleveland, Ohio, a corporation of Ohio
Filed Apr. 1, 1964, Ser. No. 356,570
13 Claims. (Cl. 137—468)

This invention relates to spring actuated devices and more particularly to methods and means for controlling the forces exerted by a spring system under various conditions of spring deflection and ambient temperature changes.

In various devices, as for example in fluid pressure relief valves, used in space vehicles and/or in the launching equipment therefor, it is desirable to have a very small spread between the fluid pressures at which the valve will crack open, provide relief flow and close. Furthermore, it is desirable that the fluid pressures at which these functions occur remain substantially constant over a wide temperature range. Thus, in a relief valve for hydrogen at 300 p.s.i. working pressures, the total allowable pressure variation under the conditions indicated above may be only 17 p.s.i. over a temperature range of 440 degrees.

The present invention meets this problem by providing a series of springs, at least one of which has a positive rate in the working range, and another of which has a negative rate in the working range. The springs act independently on the valve element and the rates are so chosen in the working range that the increase in force necessary to deflect or compress the positive rate spring when the valve element moves from closed to full open position is substantially counterbalanced by the decrease in force which occurs for the negative rate spring as the latter is simultaneously deflected whereby the total force variation for deflecting both springs simultaneously over the full valve element stroke is small.

The use of opposite rate springs in this manner also permits thermal compensation in such a way that the opening, full flow and closing pressures do not change appreciably over a selected range of temperatures. This is accomplished by compensating the positive rate spring negatively and the negative rate spring positively.

As the temperature rises, the force exerted by a spring at a given deflection decreases and conversely, when the temperature decreases, the force exerted by a spring at a given deflection increases. In the present invention, thermal compensation is provided separately for the positive and negative rate springs so that as the temperature rises, the deflection is increased for the positive rate spring and decreased for the negative rate spring and as the temperature decreases, the deflection is decreased for the positive rate spring and increased for the negative rate spring whereby the springs together will maintain substantially the same net force on the valve member at any given position of the latter regardless of temperature changes within a selected temperature range.

In the drawing,

FIGURE 1 is a vertical section through a relief valve embodying the invention,

FIGURE 2 is a cross section of a Belleville spring,

FIGURE 3 shows typical force versus deflection curves of Belleville springs, and FIGURE 4 shows force versus deflection curves for a pair of Belleville springs over a selected temperature range and illustrating how each is compensated at the valve cracking pressure.

In the FIGURE 1 form of the invention, a body 10 has an inlet port 11 surrounded by a valve seat 12 and has a discharge port 13. Mounted within the body is a movable valve element 14 having an annular flange 15. The inner surface 16 of the flange serves as a guide for a light spring 17 which bears on the valve element 14 and also against a cover 18 held in place on the body by a snap ring 19 and sealed relative to the body by packing 20.

The outer wall 21 of flange 15 serves as a slide guide for a pair of annular rings 22, 23 having shoulders 24, 25. Ring 22 bears against ring 23 and the latter rests on a shoulder 26 of a valve element 14.

A Belleville washer 27 has its lower face at the inner margin thereof resting on shoulder 24 of ring 22 and has its upper face at the outer margin thereof in engagement with a ring 29 having a conical upper face 30. Resting against face 30 is another ring 33 of triangular cross section and nested against the latter is another ring 34, also of triangular cross section. Bearing against the latter is another ring 35 having an internal conical face 36 and an upper horizontal face 37.

A second Belleville washer 42 has its lower face at the inner margin thereof resting on shoulder 25 of ring 23 and has its upper face at the outer margin thereof in engagement with ring 43 which has an internal conical upper face 44. Resting against face 44 is a ring 45 of triangular cross section and nested onto the latter is another ring 46. Bearing against the latter is another ring 47 having a conical lower face 48 and a horizontal upper face 49.

Cover 18 has an annular depending portion 50 whose inner surface serves as a guide for spring 17 and whose outer surface serves as a centering guide for rings 33, 34 and 35, but which is spaced far enough away from rings 33, 34 and 35 so as not to interfere with radial expansion or contraction thereof due to temperature changes. Likewise, wall 52 of body 10 is a centering guide for rings 43, 45, 46 and 47 without interfering with thermal expansion or contraction thereof.

In operation, fluid under pressure has access to inlet port 11. Springs 17, 42 and 27 press valve element 14 against seat 12 to keep the inlet closed until the fluid exceeds a predetermined pressure, at which time the valve element cracks from seat 12 and initiates flow of fluid to discharge port 13. As the pressure in port 11 continues to rise, the valve element lifts farther against the force of the springs to increase the flow to port 13. When the pressure in inlet port 11 falls below the predetermined value, valve element 14 reseats to cut off flow to port 13.

In the structure shown in FIGURE 1, Belleville springs 42 and 27 provide the major force for seating valve element 14 and have the advantage over coil springs in that a large force can be provided in much smaller space. Moreover, several types of deflection versus force curves are provided by Belleville springs which make it possible to have two or more Belleville springs of differing characteristics to conjointly act upon the valve element in such a manner as to obtain results which are not possible with a single spring.

As shown in FIGURE 2, Belleville washers are dished when in their unstressed condition. The ratio of the dished height $h$ over the thickness $t$ results in force-deflection curves having patterns of the type indicated in FIGURE 3, the point 54 indicating the deflection at which the Belleville spring has been deflected to a flat position.

In FIGURE 3, the curves shown are typical for $h/t$ ratios, as follows:

Curve A, $h/t < \sqrt{2}$
Curve B, $h/t = \sqrt{2}$
Curve C, $h/t > \sqrt{2}$
Curve D, $h/t = 2\sqrt{2}$
Curve D, $h/t > 2\sqrt{2}$ From FIGURE 3, it is evident that in a relief valve fitted with a single Belleville spring having an $h/t$ ratio equal to the $\sqrt{2}$ and with the spring being deflected so that the valve cracking pressure occurs at point 55 at a given temperature, the valve element will move and deflect the spring to point 56, which may be the full flow position, with little increase in fluid pressure.

When the temperature goes up or down, the curve shifts as indicated by the dotted lines. Since the spring deflection remains substantially constant, the cracking and full flow pressures will decrease or increase according to the temperature change.

If an attempt is made to compensate for temperature changes by changing the deflection of the single spring so that the cracking pressure remains constant regardless of the temperature, the pressure at full flow changes. Also, the compensation stroke becomes unreasonably large. To solve this problem a pair of Belleville springs are mounted as described herein to independently act upon the valve element. Thus, in the valve of FIGURE 1, spring 27 may have an $h/t$ ratio so as to correspond with curve A and spring 42 an $h/t$ ratio so as to correspond with curve C. The springs are so mounted that they move through the same stroke distance when the valve element moves from closed to full open position. The net force exerted upon valve element 14 by springs 27, 42 at any positon between closed and full open is the sum of the forces exerted by the two springs at that positon. The springs are so selected that they have oppositely sloping force versus deflection curves in the positions between closed and full open, that is, spring 42 has a negative slope and spring 27 a positive slope throughout the range of valve element movement. Furthermore, the springs are so selected that in the operating range the sums of the forces will increase only a slight amount between the crack and full open positon of the valve, or they may be so selected that the force required for moving the valve to full open position either remains substantially constant or even decreases.

By having one of the curves negative and the other positive in the operating range, it is possible to compensate for thermal changes so that fluid pressure for any given position of the valve element between the cracking and full open positons do not vary appreciably as the temperature changes.

With reference to FIGURE 4, curve A is that of spring 27 and curve C is that of spring 42, the full lines corresponding to normal operating temperature and the dotted lines to the lowest and highest temperatures in the selected temperature range.

Rings 29, 33, 34 and 35 compensate for temperature changes in spring 27. As evident from FIGURE 4, the deflection of spring 27 must be increased to maintain the same force at the crack point when the temperature rises and must be decreased to maintain the same force at the crack point when the temperature drops. This is accomplished by making rings 33 and 35 of a material of low coefficient of expansion, such as Invar, and making rings 29 and 34 of a material of higher coefficient of expansion, such as aluminum alloy or stainless steel.

Rings 33 and 35 maintain substantially the same diameters as the temperature increases or decreases, but rings 29 and 34 will expand in diameter at high temperatures to increase the deflection of spring 27 and will contract in diameter at low temperature to decrease the deflection of spring 27.

Also, as evident from FIGURE 4, the deflection of spring 42 must be decreased in order to maintain the same force on the valve element when the temperature increases and must be increased in order to maintain the same force on the valve element as the temperature decreases. To accomplish this, rings 45 and 47 are of Invar and rings 43 and 46 are of aluminum or stainless steel. When the temperatures increase, rings 43, 46 expand in diameter a greater extent than rings 45, 47. This shortens the overall height of the rings and decreases the deflection of spring 42. When the temperature decreases, the overall height increases to increase the deflection of spring 42.

When the valve element is at the full open position the slope of the force versus deflection curve for spring 27 remains positive and for spring 42 remains negative so that the deflection of each is changed by temperature changes in the same manner as at the cracking point. As a result, the inlet fluid pressures at which the valve cracks open, moves to full flow position and reseats changes very little regardless of temperature changes within the selected temperature range.

Shims 58 and 59 are provided for obtaining accurate initial deflection of springs 27 and 42 despite manufacturing tolerances and machining variations. Spring 17 is a light coil spring, adjusted by means of shims 60, by means of which the opening pressure for valve element 14 may be accurately adjusted. This spring exerts such a small force upon the valve element as compared with springs 27 and 42 that in most instances it need not be temperature compensated, although such compensation may be provided in the same manner as for either spring 27 or 42, as desired.

In some instances the desired operating characteristics can be obtained by temperature compensating only one of the Belleville springs. In other cases there may be one or more uncompensated Belleville springs plus oppositely compensated positive and negative rate springs.

Other changes may also be made in the arrangement and detailed construction of the device without departing from the scope of the invention, as defined by the claims.

I claim:
1. A device comprising an element movable between first and second positions, first and second spring means deflected so as to exert force upon said element and acting upon said element independently of each other and in the same direction for urging said element toward the first position, one of said spring means exerting an increasing force and the other a decreasing force upon said element during movement of said element from the first position to the second position, whereby the change in the total force exerted by both of said spring means upon said element is less than the change in force exerted by either spring means upon said element.

2. The device of claim 1 in which there is an additional spring means acting upon said element in the same direction as said first and second spring means, the force exerted by said additional spring means being small in comparison with the force exerted by said first and second spring means.

3. The device of claim 1 in which said spring means are of the Belleville type and in which the $h/t$ ratio for one of said spring means is greater than the $\sqrt{2}$ and for the other is less than the $\sqrt{2}$ where $h$ and $t$ are the respective uncompressed height and thickness of each spring.

4. The device of claim 1 in which there are additional means for separately adjusting the deflection of each spring means.

5. In a valve, a housing having a flow passage, a valve element for controlling flow of fluid through said passage and movable between open and closed positions, first and second Belleville springs exerting force upon said valve element independently of each other for yieldably maintaining said valve element in the closed position, said first spring exerting an increasing force and said second spring exerting a decreasing force upon said valve element during movement of said valve element from closed to open position and a separate compensating means acting on each spring and responsive to temperature changes for simultaneously changing the deflection of the springs in opposite directions, said compensating means for said first spring increasing the deflection of said first spring upon an increase in the temperature and said compensating means for said second spring decreasing the deflection of said second spring upon an increase in temperature to maintain substantially the same force on said valve element despite such increase in temperature.

6. In a relief valve, a housing having a flow passage, a valve element for controlling flow of fluid through said passage and movable between open and closed positions, said valve element having a pair of shoulders, first and second Belleville springs each of which engages one of said shoulders, said springs being deflected so as to exert force upon said valve element for yieldably maintaining said valve element in closed position, said first spring exerting an increasing force and said second spring a decreasing force on said valve element as the latter moves from closed to open position, abutment means engaging each spring for deflecting the same, at least one of said abutment means including compensating means for changing the deflection of the spring engaged thereby in response to changes in temperature.

7. The valve of claim 6 in which the other of said abutment means includes a compensating means for changing the deflection of the spring engaged thereby in response to changes of temperature simultaneous with and in the opposite direction of the change in deflection of the other spring.

8. The valve of claim 7 in which said first spring has its deflection increased by its compensating means upon an increase in temperature and said second spring has its deflection decreased by its compensating means upon an increase in temperature.

9. The valve of claim 6 wherein said shoulders are annular shoulders axially spaced from each other, said first Belleville spring having its inner margin engaging one of said shoulders and its outer margin engaging one of said abutment means, said second Belleville spring having its inner margin engaging the other of said shoulders and its outer margin engaging the other of said abutment means, each of said abutment means including a compensating means, the compensating means for said first spring being responsive to temperature increases for increasing the deflection of said first spring and the compensating means for said second spring being responsive to temperature increases to decrease the deflection of said second spring.

10. The valve of claim 6 wherein said compensating means includes a plurality of stacked rings having conical surfaces in mating engagement with each other, certain selected ones of said rings having a low coefficient of expansion and others having a high coefficient of expansion, whereby changes of temperature will cause a change in diameter of said other rings and thus a change in the total height of said rings to change the deflection of the spring engaged thereby.

11. The valve of claim 10 wherein there are four of said rings stacked together with the first ring engaging its associated spring and the second third, and fourth springs following in that order, said first and third rings having the higher coefficient of expansion and said second and fourth rings having a low coefficient of expansion, whereby an increase or decrease in temperature will cause an increase or decrease in the diameter of said first and third rings and thus a change in the total height of said rings.

12. The valve of claim 10 wherein said selected rings are made of an aluminum alloy and said other rings of Invar.

13. The valve of claim 10 wherein said housing is provided with an annular surface which acts as a centering guide for said rings.

References Cited

UNITED STATES PATENTS

| 1,753,024 | 4/1930 | Rode | 137—529 |
| 2,655,935 | 10/1953 | Kinzbach | 137—529 X |
| 2,727,529 | 12/1955 | Kodet | 137—529 X |
| 2,915,076 | 12/1959 | Teumer | 137—468 X |
| 3,164,165 | 1/1965 | Fox | 137—468 |

FOREIGN PATENTS

| 600,373 | 4/1948 | Great Britain. |
| 1,163,108 | 2/1964 | Germany. |

ALAN COHAN, *Primary Examiner.*

H. W. WEAKLEY, *Assistant Examiner.*